Dec. 4, 1956  R. J. KEMPER  2,772,896
SELF-COUPLING TRACTOR HITCH MEMBER OPENED
BY COMPLEMENTARY HITCH MEMBER
Filed April 14, 1954  2 Sheets-Sheet 1

INVENTOR
Ronald J. Kemper

BY
ATTORNEYS

Dec. 4, 1956 R. J. KEMPER 2,772,896
SELF-COUPLING TRACTOR HITCH MEMBER OPENED
BY COMPLEMENTARY HITCH MEMBER
Filed April 14, 1954 2 Sheets-Sheet 2

INVENTOR
Ronald J. Kemper

BY *Wilkinson & Mawhinney*

ATTORNEYS

United States Patent Office 2,772,896
Patented Dec. 4, 1956

2,772,896

SELF-COUPLING TRACTOR HITCH MEMBER OPENED BY COMPLEMENTARY HITCH MEMBER

Ronald J. Kemper, Defiance, Ohio

Application April 14, 1954, Serial No. 423,125

2 Claims. (Cl. 280—510)

The present invention relates to a tractor hitch and has for an object to provide a hitch adapted to be mounted on any form of tractor, truck, crawler tractor, factory trucks, or any other vehicle that requires a hitch for pulling any other vehicle or load behind the same.

An object of the invention is to provide a form of tractor hitch incorporating a pick-up trough or scoop of such construction as to cooperate with the tongue of the drawn equipment to the end that pick-up and entrainment of the tongue and equipment will be easy and certain, and to the end that the tongue is not required to be arranged at any certain height in order to effectively couple with the hitch when the tractor is backed into the equipment: the only requirement being a small stand to hold the tongue sufficiently high to come within the zone of action of the pick-up trough.

The invention also contemplates an arrangement in which the act of backing the tractor into the equipment will cause the hitch to automatically open and the tongue to be automatically directed into the hook of the hitch, with provision for subsequently automatically closing such hook on the tongue to prevent its accidental escape during travel.

A further object of the invention is to provide an automatically closed hitch having provision for opening the hitch by the driver of the tractor whenever it is desired to uncouple the equipment.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
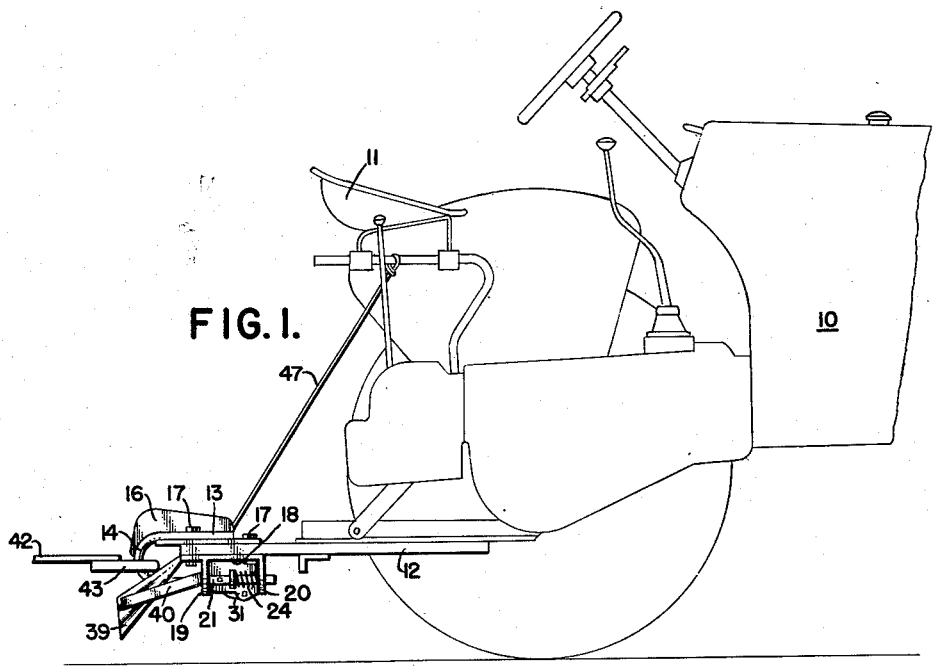
Figure 1 is a fragmentary side view of a tractor showing a form of hitch according to the invention attached to the tractor draw bar.
Figure 2:
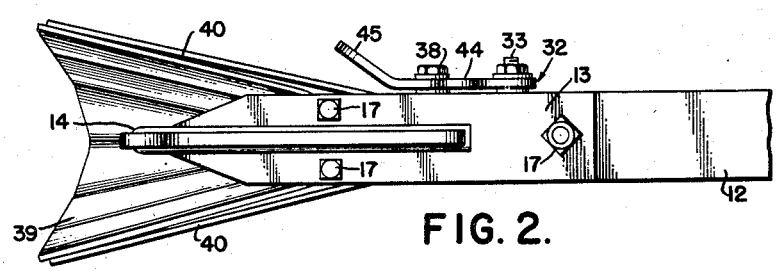
Figure 2 is a top plan view taken on an enlarged scale of a form of hitch pursuant to the invention.
Figure 3:
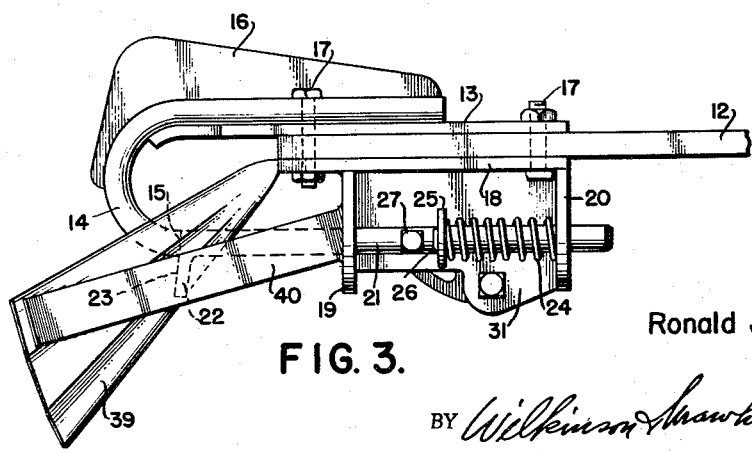
Figure 3 is a side elevational view of the same.

Referring more particularly to the drawings, 10 designates a form of tractor having a driver's or operator's seat 11 and a draw bar 12.

Pursuant to the present invention a hook plate 13 is assembled on the upper rear portion of the draw bar 12. This plate 13 carries a rearwardly projecting hook 14 which is curved downwardly and then forwardly so that its free end or bill 15 faces forwardly. The plate 13 and pulling hook 14 are reinforced by the upstanding strengthening web 16. The plate 13 may be secured to the draw bar 12 by the use of bolts or appropriate fastenings 17 or if desired welded thereto.

Beneath the draw bar and secured by welding or by the same fastenings 17 is a bracket plate 18 from which depend spaced perforated lugs 19 and 20 through which is slidingly supported a keeper or locking bolt 21 having at its rear end a striker plate 22, the rear surface 23 of which defines a forwardly and upwardly inclined striker surface for engagement with the free end 15 of the hook to close the hitch.

Figure 7:
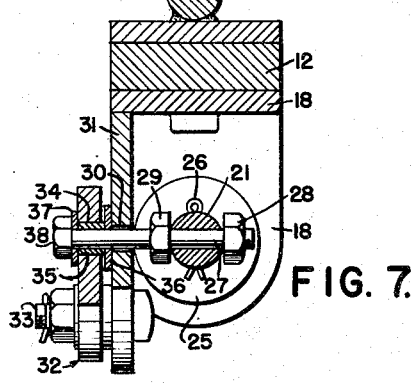
Figure 7 is a vertical cross-sectional view taken on the line 7—7 of Figure 4.

A helical spring 24 is wound in a suitable number of convolutions about the locking bolt 21 with it forward end abutting against the rear face of the forward lug 20. The rear end of the spring 24 engages a disk 25 affixed to the locking bolt 21. A cotter key 26 inserted in a transverse opening through the bolt 21 rearward of the disk 25 serves to hold the disk in place on the bolt. The bolt 21 also carries a lateral pin 27, best seen in Figure 7, being held in place on the bolt by nuts 28 and 29 which engage threads of the lateral pin 27. The pin projects through a longitudinal slot 30 made in the side plate 31, such slot being parallel with the axis of movement of the bolt 21 so that the pin 27 may move back and forth in the slot 31 incident to axial sliding movement of the bolt 21. The side plate is carried by the bracket 18 and preferably affixed to one or both of the lugs 19, 20.

The side plate 31 also carries a trip lever 32 pivoted at one end to the side plate on a pivot pin 33. A curved cam slot 34 in the lever accommodates a roller 35 surrounding the end of the lateral pin 27 which projects beyond the side wall 31. Inner and outer washers 36 and 37 are fitted about the lateral pin 27 at opposite sides of the trip lever and roller 36. The pin head 38 engages the outer washer 37. The inner washer 36 is located between the wall 31 and the roller 34 which is preferably slightly wider than the trip lever to avoid undue frictional area of contacting surfaces.

Figure 6:
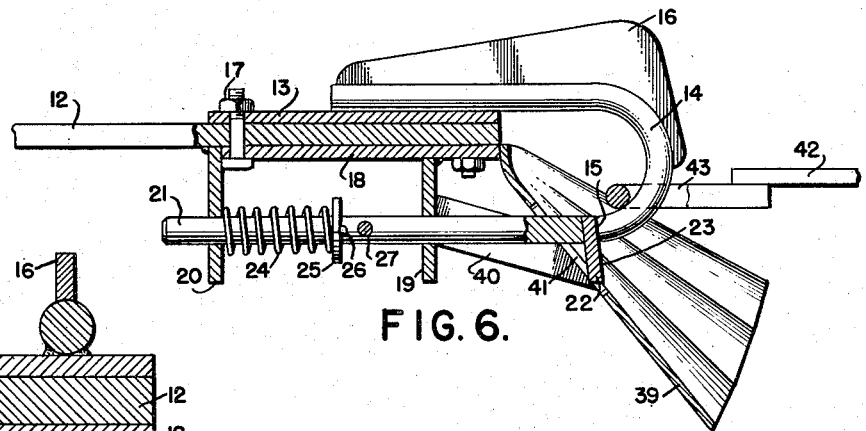
Figure 6 is a longitudinal section taken through the hitch and showing the tongue of the equipment coupled thereto.

The pick-up trough or scoop is shown at 39 being formed generally in the frustum of a cone with its upper portion removed and with its wider base toward the rear to present to the equipment or implement tongue a very wide gathering surface. This gathering surface converges forwardly to a cut-away portion 41 into which may project the striker plate 23 and the rear end of the locking bolt 21 as best seen in Figure 6. The trough 39 may be supported by braces 40 welded to the rear end of the trough 39 and to the lug 19.

The implement tongue is shown at 42 having an eye 43 adapted to become interlocked with the pulling hook 14.

Figure 4:
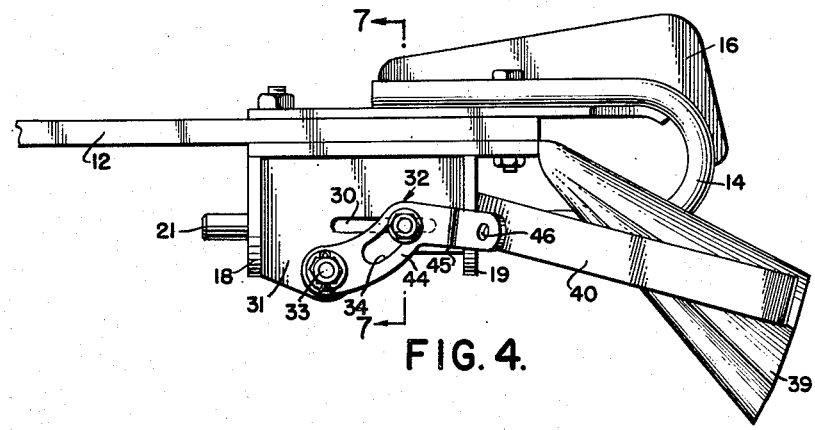
Figure 4 is also a side elevational view of the hitch taken from the side opposite to that of Figure 3.
Figure 5:
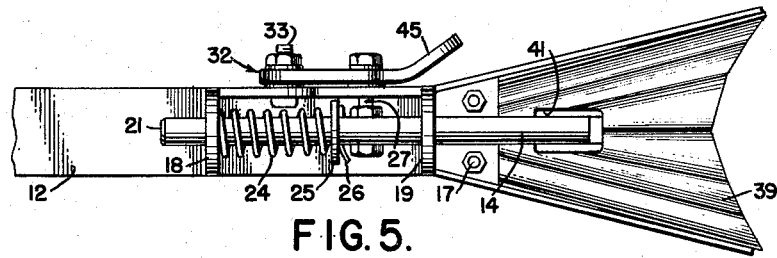
Figure 5 is a bottom plan view of the hitch.

In Figure 4 the trip lever is shown as having a curved section 44 to follow generally the curvature of the cam slot 34. The lower end of this curved section is fitted upon the pivot pin 33. The center about which the curved section of the trip lever and the curved cam slot 34 are struck is forwardly and upwardly of the hitch. In other words, the convex sides of the lever section 44 and slot 34 are directly upwardly. The trip lever also has an angular section 45 which forms an angle with the upper end of the curved lever section 44, being directed downwardly from the curved section as shown in Figure 4 and also directed outwardly away from the side plate 31 as indicated in Figure 5. The free end of this angular section 45 is provided with a perforation 46 to which the trip rope or cable 47 is attached. This trip rope, as shown in Figure 1, runs to a point at or near the tractor seat 11 so as to be convenient to the hand of the operator.

In use, the agricultural implement or other device to be drawn along trailing the tractor is arranged so that its tongue 42 will reach the elevation of the pick-up trough 39. The tractor is thereupon backed into the implement. When the eye 43 engages the trough or scoop 39 it will ride up the inclined wall thereof and be guided on to the lower portion of the striker plate 22 which extends below the end 15 of the hook 14. It will be noted from Figure 6 that the relationship between the cut-away portion 41 and the striker plate 22 is such that substantial continuity of surface exist between the rear surface of the pick-up trough 39 and the rear face 23 of the striker plate 22 which is biased by the coil spring 24 to a rearwardly projected position with its upper portion against the free end 15 of the pulling hook 14. As the tractor is continued to be backed, the engagement of the eye 43 with the surface 23 will force forwardly the bolt 21 and striker plate 22, thus opening the hook or hitch. Due to the inclination of the face 23, the eye 43 will tend to ride up this face and automatically enter the space circumscribed by the pulling hook 14. As soon as the eye 43 clears the upper surface 23, the coil spring 24, which has been compressed during this movement of the bolt 21, will snap the bolt 21 and striker plate 22 back into the position of Figure 6 with the striker plate engaging the end 15 of the hook. In other words, the spring 24 biases the keeper or locking bolt 21 to the locked or closed position of Figure 6. By moving the tractor 10 forward, the eye 43 will be engaged in the yoke of the hook 14 and the implement will be drawn along trailing after the tractor.

When the implement is to be disengaged, the operator halts the tractor and backs it to a slight extent to release the tension from the coupling. He thereupon pulls upon the trip 47 which swings the trip lever 32 around the pivot 33 in an anti-clockwise direction as viewed in Figure 4. In so doing the slot 34 cams the pin 27 and the entrained locking bolt 21 in a forward movement with the pin 27 sliding forwardly in the slot 30 of the wall 31. This motion causes the striker plate 22 to move forwardly away from the hook end 15. Due to the curved inner surface of the hook 14, the eye 43 will thereupon slide down under the influence of gravity and automatically drop out of the mouth of the open hook and on to the pick-up trough 39. Thereupon the cable or trip rope 47 can be released to permit the spring 24 to move the bolt and striker plate 22 back to the closed position. By pulling forward upon the tractor the eye 43 will slide down the pick-up trough 39 and the implement is completely uncoupled from the tractor.

The angularity of the lever section 45 is favorably disposed toward the line of pull of the cable or trip rope 47. In the same way the curved section 44 of the trip lever is favorably shaped to exert a very effective camming action directly upon the lateral pin 27 and indirectly upon the bolt 21. The roller 34 reduces the frictional contact between the pin and the walls of the slot 34.

It will be understood that only one form of the invention has been illustrated and described. For instance a hydraulic ram may be employed to shift the bolt 21 back and forth instead of the spring and trip lever and the pin.

Although I have disclosed herein the best form of the invention known to me at this time, I reserve the right to all such modifications and changes as may come within the scope of the following claims.

What I claim is:

1. A hitch comprising a hook defining a confined space, a sliding keeper operatively associated with the hook, yieldable means to close the keeper on the hook, a striker plate on the free end of the keeper having an exposed surface slanted to the confined space within the hook, a companion coupling member adapted to interlock with the hook, and means to guide the companion coupling member against the exposed surface of the striker plate to push the keeper back and to permit the companion coupling member to enter the hook.

2. A hitch comprising complementary coupling members, a wall rigidly connected to one of said coupling members, a keeper biased to a closed position on said one member, a pin laterally projecting from the keeper, said wall adjacent the keeper having a guide slot through which the pin projects and moves back and forth with the keeper, a trip lever fulcrumed on the wall and having a curved cam slot also receiving the pin, and means connected to rock the lever.

References Cited in the file of this patent

UNITED STATES PATENTS

| | | |
|---|---|---|
| 665,294 | Williams | Jan. 1, 1901 |
| 1,200,715 | Edwards | Oct. 10, 1916 |
| 1,595,880 | Schmid | Aug. 10, 1926 |
| 2,381,841 | Schultz | Aug. 7, 1945 |
| 2,478,591 | Miller | Aug. 9, 1949 |

FOREIGN PATENTS

| | | |
|---|---|---|
| 161,714 | Switzerland | July 17, 1933 |